(12) United States Patent
Kamei

(10) Patent No.: US 12,438,392 B2
(45) Date of Patent: Oct. 7, 2025

(54) WIDE-AREA POWER SUPPLY SYSTEM

(71) Applicant: LAND BUSINESS CO., LTD., Tokyo (JP)

(72) Inventor: Masamichi Kamei, Tokyo (JP)

(73) Assignee: LAND BUSINESS CO., LTD., Tokyo (JP)

( * ) Notice: Subject to any disclaimer, the term of this patent is extended or adjusted under 35 U.S.C. 154(b) by 662 days.

(21) Appl. No.: 17/905,527

(22) PCT Filed: Feb. 17, 2021

(86) PCT No.: PCT/JP2021/005803
§ 371 (c)(1),
(2) Date: Sep. 2, 2022

(87) PCT Pub. No.: WO2021/177028
PCT Pub. Date: Sep. 10, 2021

(65) Prior Publication Data
US 2023/0147457 A1 May 11, 2023

(30) Foreign Application Priority Data

Mar. 4, 2020 (JP) .................................. 2020-036883

(51) Int. Cl.
*F17C 13/08* (2006.01)
*H02J 3/38* (2006.01)
(Continued)

(52) U.S. Cl.
CPC ............ *H02J 15/008* (2020.01); *F17C 13/08* (2013.01); *H02J 3/381* (2013.01);
(Continued)

(58) Field of Classification Search
CPC ...... H02J 15/008; H02J 3/381; H02J 2300/22; H02J 2300/28; H02J 2300/30;
(Continued)

(56) References Cited

U.S. PATENT DOCUMENTS

2003/0227276 A1* 12/2003 Agbossou ......... H01M 8/04992
320/112
2004/0013923 A1 1/2004 Molter et al.
(Continued)

FOREIGN PATENT DOCUMENTS

| JP | 2002-234703 A | 8/2002 |
| JP | 2005-220946 A | 8/2005 |

(Continued)

OTHER PUBLICATIONS

International Search Report issued in corresponding International Application No. PCT/JP2021/005803; dated Apr. 27, 2021.
(Continued)

*Primary Examiner* — Michael J Brown
(74) *Attorney, Agent, or Firm* — Chrisman Gallo Tochtrop LLC

(57) ABSTRACT

A wide-area power supply system has a small impact on the environment and is highly economical, as a wide-area power supply network that uses hydrogen energy without requiring conventional transmission towers, etc., the wide-area power supply system comprising: a primary power plant; a hydrogen production facility which produces hydrogen by using electricity from the primary power plant; a primary hydrogen storage facility distributed over a wide area; a secondary hydrogen storage facility distributed for each primary hydrogen storage facility; a regional power grid which sends power to power consuming facilities or dwelling units within a residential area; a secondary power generation facility which is installed within the residential area and converts hydrogen transported via the primary hydrogen storage facility or the secondary hydrogen storage facility into electric power; and a transportation means such as a trailer for transporting hydrogen between the hydrogen production facility and the primary hydrogen storage facility, between the primary hydrogen storage facility and the
(Continued)

secondary hydrogen storage facility, and between the primary hydrogen storage facility or the secondary hydrogen storage facility and the secondary power generation facility.

10 Claims, 1 Drawing Sheet

(51) Int. Cl.
  *H02J 15/00* (2006.01)
  *H01M 8/04* (2016.01)
(52) U.S. Cl.
  CPC .............. *F17C 2221/012* (2013.01); *F17C 2270/0168* (2013.01); *F17C 2270/0581* (2013.01); *H02J 2300/22* (2020.01); *H02J 2300/28* (2020.01); *H02J 2300/30* (2020.01)
(58) Field of Classification Search
  CPC ...... H02J 2300/20; H02J 2300/24; H02J 3/28; H02J 3/38; H02J 15/00; F17C 13/08; F17C 2221/012; F17C 2270/0168; F17C 2270/0581; F17C 5/06; F17C 7/00; F17C 2265/068; F17C 13/00; F17C 2270/0184; F17D 1/04; Y02E 60/36; Y02E 60/50; Y02E 70/30; G06Q 50/06; H01M 8/0656; H01M 8/04; C25B 1/04
  USPC ........................................................ 700/286
  See application file for complete search history.

(56) References Cited

U.S. PATENT DOCUMENTS

| | | | |
|---|---|---|---|
| 2005/0276749 A1* | 12/2005 | Noujima | H01M 8/06 423/658.2 |
| 2008/0127646 A1 | 6/2008 | Doland | |
| 2008/0305371 A1* | 12/2008 | Hermann | C10J 3/00 48/199 R |
| 2009/0048716 A1 | 2/2009 | Marhoefer | |
| 2019/0249319 A1 | 8/2019 | Joos et al. | |
| 2019/0319285 A1 | 10/2019 | Milos | |
| 2022/0106939 A1* | 4/2022 | Ward | F03D 9/11 |

FOREIGN PATENT DOCUMENTS

| | | |
|---|---|---|
| JP | 6005503 B2 | 10/2016 |
| WO | 2011/144198 A1 | 11/2011 |
| WO | 2017/098662 A1 | 6/2017 |
| WO | 2018/069993 A1 | 4/2018 |
| WO | 2018/078695 A1 | 5/2018 |
| WO | 2018/078875 A1 | 5/2018 |

OTHER PUBLICATIONS

Written Opinion issued in corresponding International Application No. PCT/JP2021/005803; dated Apr. 15, 2021.
Supplementary European Search Report issued in corresponding application, EP 21 76 5491, dated Feb. 14, 2024.
Examination Report issued in corresponding Egyptian application, 2022091259, dated Sep. 4, 2022.
Weinmann Oliver: "Hydrogen—the flexible storage for electrical energy", Power Engineering Journal, Institution of Electrical Engineers, Jan. 1, 1999 (Jan. 1, 1999), pp. 164-170, Hitchin, GB, vol. 13, No. 3.
Yang et al: "Hydrogen and electricity: Parallels, interactions, and convergence", International Journal of Hydrogen Energy, Apr. 1, 2008 (Apr. 1, 2008), pp. 1977-1994, Elsevier, Amsterdam, NL, vol. 33, No. 8.
Ferrero Domenico et al: "Power-to-Gas Hydrogen: Techno-economic Assessment of Processes towards a Multi-purpose Energy Carrier", Energy Procedia, Dec. 29, 2016 (Dec. 29, 2016), pp. 50-57, Elsevier, NL, vol. 101.
Haeseldonckx et al: "The use of the natural-gas pipeline infrastructure for hydrogen transport in a changing market structure", International Journal of Hydrogen Energy, Jun. 7, 2007 (Jun. 7, 2007), pp. 1381-1386, Elsevier, Amsterdam, NL, vol. 32, No. 10-11.
Hake J Fetal: "Prospects for hydrogen in the German energy system", Energy Policy, Jul. 1, 2006 (Jul. 1, 2006), pp. 1271-1283, Elsevier, Amsterdam, NL, vol. 34, No. 11.
John Andrews et al: "Re-envisioning the role of hydrogen in a sustainable energy economy", International Journal of Hydrogen Energy, Sep. 27, 2011 (Sep. 27, 2011), pp. 1184-1203, Elsevier, Amsterdam, NL, vol. 37, No. 2.

* cited by examiner

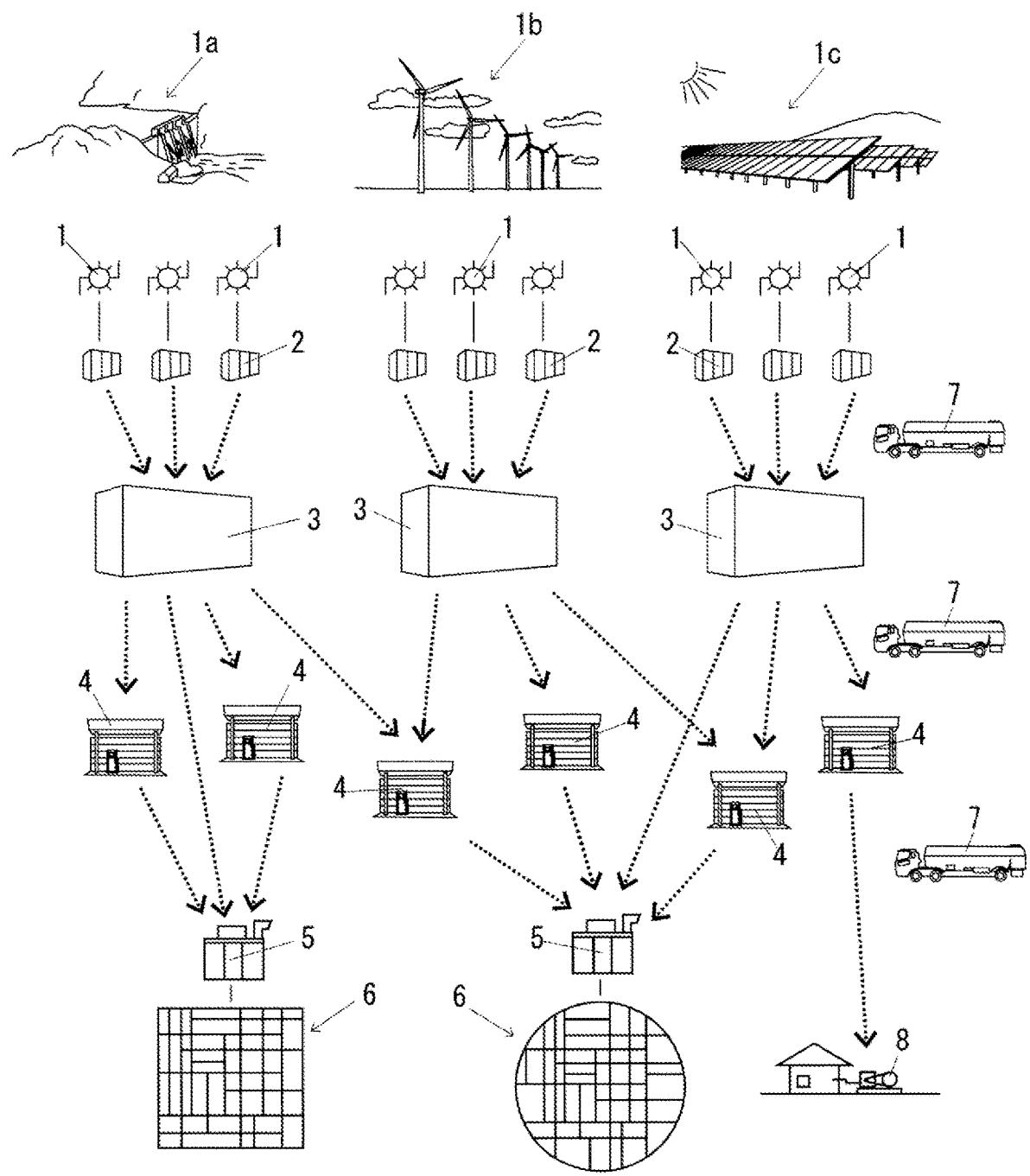

WIDE-AREA POWER SUPPLY SYSTEM

CROSS-REFERENCE TO RELATED APPLICATIONS

This application is a U.S. National Stage entry of PCT/JP2021/005803, filed Feb. 17, 2021, which claims benefit of priority to Japanese application JP 2020-036883, filed Mar. 4, 2020, the entire disclosures of which are incorporated herein by reference.

TECHNICAL FIELD

This invention relates to a wide-area power supply system that uses hydrogen energy without requiring conventional transmission towers, etc.

BACKGROUND ARTS

Global warming caused by greenhouse gas emissions has become a serious problem. In this connection, a power supply system that uses hydrogen energy has been attracting attention as one approach to solve the global warming problem, and consequently, has been subjected to a lot of demonstration experiments, and some types of power supply system have been put into practical applications.

Generally, one mode of the power supply system that uses hydrogen energy is constituted of processes in the order of production of hydrogen with a hydrogen production apparatus or a hydrogen production facility by using electricity generated in a power plant or a power generation facility, storage of produced hydrogen in a hydrogen storage apparatus or a hydrogen storage facility and supply of power resulting from hydrogen power generation from the stored hydrogen with a hydrogen gas turbine, etc., as usual power.

In addition to the above, the hydrogen energy has been put into various applications such as supply of hydrogen to a fuel cell vehicle in a hydrogen station.

For instance, some inventions disclosed in the following patent documents are known as the technology concerning hydrogen energy applications.

As one method with which energy can be supplied to a hydrogen vehicle and a fuel cell vehicle by using renewable energy in a stably and efficiently self-sustaining manner, a patent document 1 below discloses an electric power/hydrogen supply system that comprises a renewable energy power generation unit, a power storage unit which stores part of generated power, a water supply unit which supplies water for electrolysis, a water electrolysis unit which produces hydrogen and oxygen by using the power stored by the power storage unit to electrolyze the water supplied by the water supply unit, a hydrogen storage unit which stores the hydrogen produced by the water electrolysis unit, an oxygen storage unit which stores the oxygen produced by the water electrolysis unit, a hydrogen power generation unit which performs power generation by using the hydrogen stored in the hydrogen storage unit, a water recovering unit which recovers water generated during power generation by the hydrogen power generation unit, a heat storage unit which stores heat generated in the renewable energy power generation unit during power generation and supplies the heat to the water electrolysis unit when hydrogen production is performed by the water electrolysis unit, a power supply unit which supplies the power stored in the power storage unit to a supply target, a hydrogen supply unit which supplies, to the supply target, the hydrogen stored in the hydrogen storage unit or a hydrogen-containing medium, and a control unit which monitors the power, hydrogen and heat supply-and-demand status in each unit and controls each unit operation so as to make up for a probable future deficiency on the basis of the monitored supply-and-demand status.

As one hydrogen energy supply system used for a building, a patent document 2 below discloses a system that comprises a hydrogen energy generation part which generates power by using stored hydrogen, a power supply part which is capable of performing supply of power supplied from the hydrogen energy generation part, via at least either of a first route through which the power is supplied to the outside of the building and a second route through which the power is supplied to the inside of the building, and a control part which controls the power supplied by the power supply part, the control part being configured so as to perform at least either of control for starting power supply that is to be performed via the first route and control for increasing a power supply range in the first route, when a power failure occurs in a power system.

As one hydrogen energy system which is capable of performing more efficient energy transfer to and from an energy network, a patent document 3 below discloses a hydrogen energy system that comprises an acquisition part which acquires a plurality of prescribed time-series physical quantities concerning production of hydrogen, a setting part which sets priority for each time-series physical quantity, and a planning part which generates a plurality of mutually associated time-series planned values, the planning part being configured so as to generate the planned value corresponding to each of the time-series physical quantities in accordance with the priority for each physical quantity.

A patent document 4 below discloses a hydrogen energy storage system that comprises a hydrogen production part which produces hydrogen by means of water electrolysis by using power from a power generation part which performs power generation by using renewable energy, a hydrogen storage part which stores the hydrogen produced by the hydrogen production part, a hydrogen power generation part which supplies, to a load, the power generated by using hydrogen acquired via a route communicating with the hydrogen storage part, a supply part which performs supply of hydrogen via a route different from a route through which the hydrogen stored in the hydrogen storage part is supplied to the hydrogen power generation part, a hydrogen amount acquisition part which acquires a first amount of hydrogen to be supplied by the supply part in a given period of time, and a control unit which controls at least either of the hydrogen power generation part and the hydrogen production part in accordance with the first amount of hydrogen.

As one power supply technology with which the diagnosis for degradation level of a hydrogen storage capacity can be performed without need to stop a system operation as a whole, a patent document 5 below discloses a power supply system that comprises a hydrogen production part which produces first hydrogen gas by using power from a power generator, at least two or more tanks to which a first transportation pipe for transportation of the first hydrogen gas is connected and in which a hydrogen storage material is housed, a fuel cell to which second hydrogen gas emitted from the hydrogen storage material is transported via a second transportation pipe connected to these tanks, a depressurizing pump which depressurizes the inside of one of the tanks in a condition where transportation of both the first hydrogen gas and the second hydrogen gas in said one tank is stopped, a third transportation pipe for transportation of third hydrogen gas to the inside of the depressurized tank, and a measurement part which measures a transported third hydrogen gas amount.

In addition to the above, as one hydrogen transportation system which is capable of transporting hydrogen produced in a hydrogen production plant to target hydrogen consuming facilities easily in a short period of time and allows for utilization of the existing facilities, a patent document 6 below discloses a hydrogen transportation system that comprises a hydrogen production plant which produces hydrogen by means of water electrolysis with power generated by using natural energy, the hydrogen transportation system being provided with a storage means which stores the produced hydrogen in a plurality of transportation tanks, a first transportation means which transports the plurality of transportation tanks in a loaded state to a port facility located near a hydrogen station, and a second transportation means which performs individual transportation of each transportation tank unloaded from the first transportation means for each target hydrogen station.

Moreover, in relation to one mode of a power network that uses hydrogen energy, a patent document 7 below contains a description concerning the fact that power generated in a hydrogen power generator by using produced hydrogen gas is supplied for various applications to power consuming places such as production and manufacturing facilities, amusement and sports facilities, shopping malls or like commercial and distribution facilities, government offices or like public facilities, chemical factories, infrastructural facilities, detached houses and/or apartments or like residential accommodations, bioprocessing apparatuses for excretion and garbage treatments, decalin/cyclohexane supply stands and organic hydride centers.

PRIOR ART DOCUMENTS

Patent Documents

Patent document 1: Japanese Patent Publication No. 6005503
Patent document 2: International Publication No. WO2017/098662
Patent document 3: International Publication No. WO2018/078875
Patent document 4: International Publication No. WO2018/069993
Patent document 5: International Publication No. WO2018/078695
Patent document 6: Japanese Unexamined Patent Application Publication No. 2005-220946
Patent document 7: Japanese Unexamined Patent Application Publication NO. 2002-234703

SUMMARY OF THE INVENTION

Problems to be Solved by the Invention

Hydrogen energy is clean and environmentally friendly energy with almost no carbon dioxide or like harmful matter emissions that will lead to global warming, and besides, has the advantages of being able to be stored and transported.

On the other hand, it is said that there are some disadvantages with the hydrogen energy under the existing circumstances, in terms of hydrogen production cost, hydrogen transportation cost and conversion efficiency and/or cost in conversion of produced hydrogen into electricity and/or heat.

However, even an existing power supply network based on transmission towers and transmission lines has also problems that construction and maintenance for developments of such power supply network present a huge cost, and that the power supply network can be brought into a shutoff state due to natural disasters such as earthquakes and typhoons. Besides, works of repairing and/or replacement of deteriorated towers will involve a huge cost as well.

Meanwhile, in regards to the cost and/or conversion efficiency problems considered to be the disadvantages to the hydrogen energy in utilization thereof under the existing circumstances, substantial improvement is expected as the hydrogen energy becomes widely available and also with the advance of hydrogen-based technologies, and accordingly, it can be believed that a cost reduction will be achieved in the long run, thereby allowing a significant economic effect to be expected.

A wide-area power supply system of the present invention is a system that has been invented in view of the above background arts and with the object of providing a wide-area power supply system that has a small impact on the environment, is highly economical and can minimize even the effects of natural disasters, as a wide-area power supply network that uses hydrogen energy without requiring conventional transmission towers, etc.

Means for Solving the Problems

A wide-area power supply system of the present invention is to use hydrogen energy and comprises one or more primary power plants for performing supply of power to a wide area, a hydrogen production facility which produces hydrogen by using electricity generated in the primary power plant, a plurality of primary hydrogen storage facilities which are distributed over a wide area and store the hydrogen produced in the hydrogen production facility, a plurality of secondary hydrogen storage facilities which are distributed for each primary hydrogen storage facility, a regional power grid which is placed in a plurality of specified residential areas and sends power to power consuming facilities or dwelling units within each specified residential area, a secondary power generator or a secondary power generation facility which is installed for each specified residential area and converts the hydrogen transported via the primary hydrogen storage facility or the secondary hydrogen storage facility into electric power, and a large number of transportation means for transporting the hydrogen between the hydrogen production facility and the primary hydrogen storage facility, between the primary hydrogen storage facility and the secondary hydrogen storage facility and between the primary hydrogen storage facility or the secondary hydrogen storage facility and the secondary power generation facility.

The regional power grid in the present invention is supposed to be mainly a power grid constituted of power cables undergrounded within the specified residential area. The present invention is aimed at making it possible to eliminate a conventional power transmission system based on transmission lines laid around along a large number of transmission towers, in which case, even an urban area power supply system shall preferably also take the form of a power supply system based on undergrounded power cables without use of any electric poles, etc.

By so doing, a naturally beautiful cityscape scenery can be created, and besides, an effect of being less subject to natural disasters, etc. can be obtained.

While the primary power plant shall be preferably a power plant provided with a hydraulic, solar or wind power generation facility that uses renewable energy having a small impact on the environment, it can be considered that a combination with other conventional power plant is also acceptable in some cases depending on the conditions, until a desired supply amount of power generated by using the renewable energy is secured.

The hydrogen production facility in the present invention is supposed to produce the hydrogen by using electricity generated in the primary power plant, in which case, a hydrogen production method may be usually by electrolysis of water, but is not limited thereto.

The specified residential area referred to in the present invention means a residential area having urban functions including buildings such as multiple dwelling housings, office buildings, public facilities and hospitals, for instance. These types of specified residential area may also include dwelling units such as detached houses and are hence supposed to be an area which constitutes a single urban space regarded as a life space of the people, together with parks, woods, lakes, recreation facilities and various traffic facilities and installations.

More specifically, the residential area may be an urban area as a residential space provided with a flood barrier having an urban structure such that in the periphery of a building such as multiple dwelling housing, hotel, office building, hospital and factory, the flood barrier made to be watertight is constructed in a place spaced apart from the building so as to enclose nearly the entire periphery of the building except openings serving as an entrance and exit at normal times, the flood barrier being made to be at least as tall as an inundation depth estimated to occur in an applicable target area, as well as to have durability capable of resisting the water pressure at least corresponding to the estimated inundation depth, and an opening sealing means for sealing the openings of the flood barrier in a watertight manner during inundation is provided in the openings, as disclosed in Japanese Patent Publication No. 6501961, for instance.

Further, the remaining land area in between the distributed specified residential areas may be utilized as an area with a highway network and/or railroad network developed, or with the natural environments preserved as they are, or alternatively, for creation of artificial woods and/or lakes, large-scaled parks and leisure facilities, etc., as well.

The secondary power generator or the secondary power generation facility in the present invention is to convert hydrogen energy into electricity for supply of electricity to the regional power grid, in which case, all or some of the secondary power generators or of the secondary power generation facilities shall be preferably in the form of a hydrogen gas turbine power plant as one large-capacity energy conversion system.

By installation of such hydrogen gas turbine power plant so as to be located close to a certain specified residential area outside the specified residential area, the supply of the resultant electricity to the regional power grid can be performed without affecting the traffics in the specified residential area.

Further, as another mode of reconversion of hydrogen energy into electricity, a hydrogen fuel engine or a hydrogen fuel cell is included, in which case, secondary power generation can be performed by installation of the hydrogen fuel engine or the hydrogen fuel cell in some of the secondary power generators or of the secondary power generation facilities. Because of the fact that it is difficult for the hydrogen fuel engine or the hydrogen fuel cell to generate large-capacity power as much as that generated in the hydrogen gas turbine power plant, the hydrogen fuel engine or the hydrogen fuel cell should be arranged appropriately in accordance with city planning.

The transportation means can employ a vehicle such as a trailer and a curdle-typed high-pressure hydrogen transportation vehicle. These types of vehicle can be applied to construction of a power supply network mainly based on hydrogen transportation vehicles in lieu of the conventional power supply network based on the transmission towers in such a way as to build and maintain roads suitable for traffic with large vehicles in places between the hydrogen production facility and the primary hydrogen storage facility, between the primary hydrogen storage facility and the secondary hydrogen storage facility and between the primary hydrogen storage facility or the secondary hydrogen storage facility and the secondary power generation facility.

Further, in regards to one stepwise configuration of transportations from the hydrogen production facility to the primary hydrogen storage facility, from the primary hydrogen storage facility to the secondary hydrogen storage facility, and from the primary hydrogen storage facility or the secondary hydrogen storage facility to the secondary power generation facility, a highly efficient wide-area power supply system can be constructed by improvements of a transportation network appropriate for such change in use of the transportation means as to change the transportation means from a large transportation means to a small transportation means in accordance with approaching to the specified residential area regarded as a power consuming place.

Alternatively, transportation with a ship serving as a river or marine transportation means can be also applied to part of transportation as well, depending on applicable regional characteristics.

It may be possible also that one or more hydrogen-handleable hydrogen stations are installed within the specified residential area separately from the regional power grid to supply the hydrogen to a vehicle such as a fuel cell vehicle (FCV) and/or to allow for direct supply of the hydrogen to the factories, hospitals or like power consuming facilities or homes, etc., located within the specified residential area.

Even in cases where more efficient electric wiring installation could be achieved with the regional power grid, conversion of hydrogen sent to the hydrogen station into electricity can be performed for direct supply to the consumers. By installation of a small-sized power generator such as a hydrogen fuel engine device and a home hydrogen fuel cell in the individual homes, for instance, the hydrogen energy can be directly used together in each home, in addition to the electricity from the regional power grid. In this case, heat energy can be also taken out for use in the form of warm water, etc., at the same time as conversion into the electricity.

Namely, an individual power generation means that uses hydrogen is installed together with a hydrogen supply means at least in some of the power consuming facilities or of the dwelling units within the specified residential area to individually allow for use of the electricity based on the hydrogen energy.

In regards to use of hydrogen energy of small capacity in homes or comparatively small-scaled power consuming facilities, a home hydrogen fuel cell or a small-sized hydrogen fuel engine, etc., is considered to be applicable, in which case, a cassette-type detachably replaceable hydrogen tank, etc., can be used as the hydrogen supply means.

Effects of the Invention

The wide-area power supply system of the present invention is a system that uses clean and environmentally less impacted hydrogen energy with almost no carbon dioxide or like harmful matter emissions that will lead to global warming, and the hydrogen energy has the advantages of being able to be stored and transported.

All things considered, use of the primary power plant such as the power plant provided with the hydraulic, solar or wind power generation facility that uses renewable energy having a small impact on the environment makes it possible to largely contribute to solution of the global warming and other environmental problems.

While it is said that there are some disadvantages with the hydrogen energy under the existing circumstances, in terms of hydrogen production cost, hydrogen transportation cost and conversion efficiency and/or cost in conversion of produced hydrogen into electricity and/or heat, even the power supply network based on the transmission towers and transmission lines has also the problems that construction and maintenance for developments of such power supply network presents a huge cost, and that the power supply network can be brought into a shutoff state due to the natural disasters such as earthquakes and typhoons and/or that works of repairing and/or replacement of the deteriorated transmission towers will involve a huge cost. Accordingly, in the long run, use of the trailer, the curdle-typed transportation vehicle or like vehicle as the transportation means can be considered to be more highly flexible, and hence, it can be said that a system which is rather economical is obtained.

Further, the transmission towers and transmission lines cause impairment of scenery to a great degree, and hence, elimination of these transmission towers and transmission lines enables preservation of beautiful natural scenery. Further, the transmission towers and transmission lines may pose a risk of serious economic losses caused by the natural disasters such as earthquakes and typhoons, whereas the transportation means such as the vehicle hardly suffers from disaster damages and is thus considered to be highly economical also in terms of ease to exchange the vehicle for another even when damaged.

Because the hydrogen energy based on the produced hydrogen can be stored in large amount and transported with high flexibility, it is possible, from the viewpoint of the supply of power, to realize not only protection of cities and/or regions and country from the disasters but also power supply in a variable manner according to the situation at that time.

In regards to the cost and/or conversion efficiency considered to be the disadvantages to the hydrogen energy in utilization thereof under the existing circumstances, substantial improvement is expected as the hydrogen energy becomes widely available, and also with the advance of the hydrogen-based technology, and accordingly, it can be believed that a cost reduction will be achieved in the long run, thereby allowing a significant economic effect to be expected.

BRIEF DESCRIPTION OF THE DRAWINGS

FIG. 1 is a view conceptionally showing an overall wide-area power supply system of the present invention.

MODE FOR EMBODYING THE INVENTION

Hereinafter will be described the present invention with reference to the attached drawing.

FIG. 1 is a view conceptionally showing an overall wide-area power supply system of the present invention.

The flow of the power supply system shown in FIG. 1 generally goes in the order of a primary power plant 1, a hydrogen production facility 2, a primary hydrogen storage facility 3, a secondary hydrogen storage facility 4, a secondary power generation facility 5 (or a hydrogen gas turbine power plant) and a regional power grid 6.

First of all, electricity generated in the primary power plant 1 is sent to the hydrogen production facility 2 attached to or installed close to the primary power plant 1 to produce hydrogen in the hydrogen production facility 2.

From the viewpoint of environmental preservation, a hydraulic power plant 1a, a wind power plant 1b or a solar power plant 1c or like power plant that uses renewable energy shall be preferably applied to the primary power plant 1.

The hydrogen production facility 2 is provided with a water electrolysis apparatus, etc., and can produce hydrogen by using electricity from the primary power plant 1.

The hydrogen produced in the hydrogen production facility 2 is transported with a transportation means such as a trailer 7 to the primary hydrogen storage facilities distributed over a wide area.

Further, a plurality of secondary hydrogen storage facilities 4 as smaller-scaled storage facilities is distributed for each primary hydrogen storage facility 3, wherein the hydrogen is transported on demand with the transportation means such as the trailer 7 from the primary hydrogen storage facility 3 toward the secondary hydrogen storage facility 4, followed by being stored in the secondary hydrogen storage facility 4.

The secondary hydrogen storage facilities 4 include a small-scaled secondary hydrogen storage facility which can be, in some cases, equal in scale to a hydrogen station used as a facility for supplying hydrogen to a vehicle such as a fuel cell vehicle (FCV).

The regional power grid 6 is supposed to be a power grid constituted of power cables undergrounded within a specified residential area. Even an urban power supply system shall also take the form of a power supply system based on the undergrounded power cables without use of any electric poles, etc., thereby allowing beautiful cityscape scenery to be created and maintained.

The secondary power generation facility 5 such as a hydrogen gas turbine power plant is installed close to the regional power grid 6 in the specified residential area, wherein secondary power generation is performed by using the hydrogen directly transported with the trailer 7, etc., from the secondary hydrogen storage facility 4 or the primary hydrogen storage facility 3, and electricity resulting from this secondary power generation is supplied to the regional power grid 6.

Further, as another mode of reconversion of hydrogen energy into electricity, the hydrogen energy can be used separately from or in combination with the power from the regional power grid by installation of a secondary power generator 8 such as a hydrogen fuel engine and a hydrogen fuel cell in each home within the specified residential area.

In regards to use of hydrogen energy of small capacity in homes or comparatively small-scaled power consuming facilities, a home hydrogen fuel cell or a small-sized hydrogen fuel engine, etc., is considered to be applicable, in which case, a cassette-type detachably replaceable hydrogen tank, etc., can be used as a hydrogen supply means.

EXPLANATION OF REFERENCE NUMERALS

1 . . . Primary power plant, 1a . . . Hydraulic power plant, 1b . . . Wind power plant, 1c . . . Solar power plant, 2 . . . Hydrogen production facility, 3 . . . Primary hydrogen storage facility, 4 . . . Secondary hydrogen storage facility, 5 . . . Secondary power generation facility (Hydrogen gas turbine power plant), 6 . . . Regional power grid, 7 . . . Trailer, 8 . . . Secondary power generator

The invention claimed is:

1. A wide-area power supply system comprising:
one or more primary power plants for performing supply of power to a wide area;
a hydrogen production facility which produces hydrogen by using electricity generated in said primary power plant;
a plurality of primary hydrogen storage facilities which are distributed over a wide area and store the hydrogen produced in said hydrogen production facility;
a plurality of secondary hydrogen storage facilities which are distributed for each primary hydrogen storage facility;
a regional power grid which is placed within a plurality of specified residential areas and sends power to power consuming facilities or dwelling units within each specified residential area;
a secondary power generator or a secondary power generation facility which is installed for each specified residential area and converts the hydrogen transported via said primary hydrogen storage facility or said secondary hydrogen storage facility into electric power; and
a large number of transportation means for transporting said hydrogen between said hydrogen production facility and said primary hydrogen storage facility, between said primary hydrogen storage facility and said secondary hydrogen storage facility and between said primary hydrogen storage facility or said secondary hydrogen storage facility and said secondary power generation facility,
wherein said regional power grid is mainly constituted of undergrounded power cables within said specified residential area.

2. The wide-area power supply system according to claim 1, wherein said primary power plant includes a power plant provided with a hydraulic, solar or wind power generation facility.

3. The wide-area power supply system according to claim 1, wherein said hydrogen production facility is to produce the hydrogen by means of electrolysis of water by using electricity generated in said primary power plant.

4. The wide-area power supply system according to claim 1, wherein said specified residential area includes a residential area having urban functions at least including buildings such as multiple dwelling housings, office buildings, public facilities and hospitals.

5. The wide-area power supply system according claim 1, wherein at least some of said secondary power generators or of said secondary power generation facilities include a hydrogen gas turbine power plant.

6. The wide-area power supply system according to claim 1, wherein some of said secondary power generators or of said secondary power generation facilities are to apply a hydrogen fuel engine or a hydrogen fuel cell.

7. The wide-area power supply system according to claim 1, wherein said transportation means includes a trailer or a curdle-typed transportation vehicle.

8. The wide-area power supply system according to claim 1, wherein one or more hydrogen stations for individually supplying said hydrogen are installed within said specified residential area.

9. The wide-area power supply system according to claim 1, wherein an individual power generation means that uses hydrogen is installed together with a hydrogen tank at least in some of the power consuming facilities or of the dwelling units within said specified residential area.

10. The wide-area power supply system according to claim 9, wherein said individual power generation means installed in said dwelling units includes a home hydrogen fuel cell or a hydrogen fuel engine, and said hydrogen tank also installed therein includes a detachably replaceable hydrogen tank.

* * * * *